United States Patent [19]

Tsuji

[11] Patent Number: 4,807,982
[45] Date of Patent: Feb. 28, 1989

[54] LENS SYSTEM OF VARIABLE MAGNIFICATION RANGE AND HAVING A SUPPLEMENTARY LENS UNIT

[75] Inventor: Sadahiko Tsuji, Kanagawa, Japan

[73] Assignee: Canon Kabushiki Kaisha, Tokyo, Japan

[21] Appl. No.: 42,024

[22] Filed: Apr. 24, 1987

[30] Foreign Application Priority Data

May 10, 1986 [JP]  Japan .................. 61-107443
May 10, 1986 [JP]  Japan .................. 61-107444
May 10, 1986 [JP]  Japan .................. 61-107445

[51] Int. Cl.$^4$ .................. G02B 15/02; G02B 15/177
[52] U.S. Cl. .................. 350/422; 350/426
[58] Field of Search .............. 350/422, 426, 423, 427

[56] References Cited

U.S. PATENT DOCUMENTS

| | | | |
|---|---|---|---|
| 2,906,172 | 9/1959 | Klemt .................. | 350/422 |
| 4,146,305 | 3/1979 | Tanaka .................. | 350/422 |
| 4,157,211 | 6/1979 | Tanaka et al. .......... | 350/422 |
| 4,318,592 | 3/1982 | Tanaka .................. | 350/422 X |
| 4,330,180 | 5/1982 | Tanaka .................. | 350/422 X |

Primary Examiner—John K. Corbin
Assistant Examiner—Scott J. Sugarman
Attorney, Agent, or Firm—Fitzpatrick, Cella, Harper & Scinto

[57] ABSTRACT

A zoom lens comprising, from front to rear, a first lens unit of negative refractive power and a second lens unit of positive refractive power, in which either by moving the second lens unit forward to vary the magnification from the wide angle side to the telephoto side, a supplementary lens system is attached on the image side of the second lens unit in the middle of the course of varying the magnification or in the zooming position of the telephoto end side, or by moving at least the second lens unit forward, the supplementary lens system is attached, to change the focal length of the entire system.

12 Claims, 3 Drawing Sheets

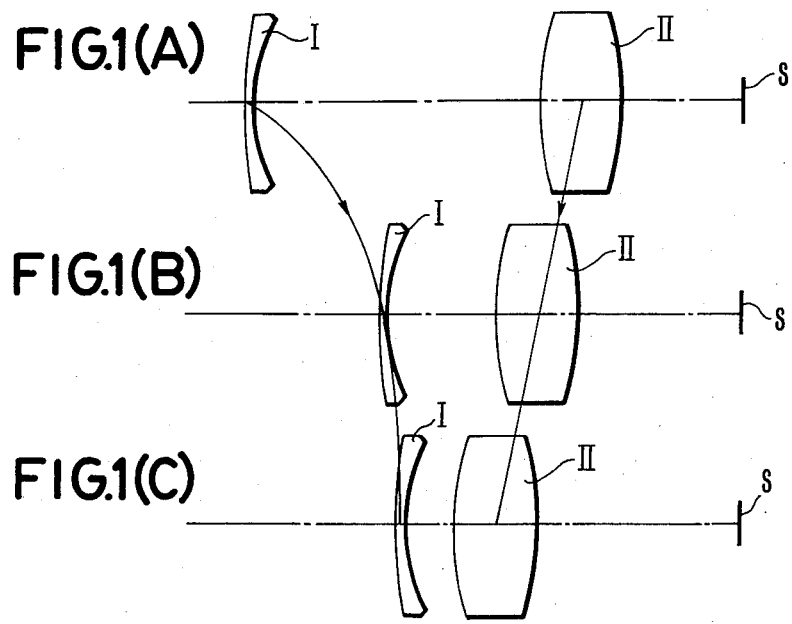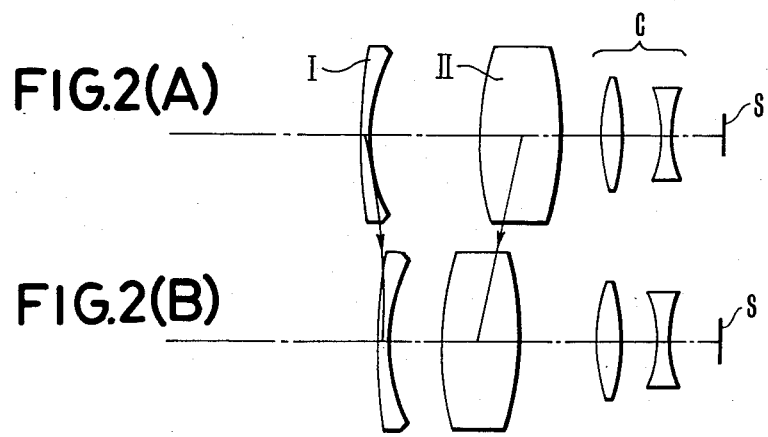

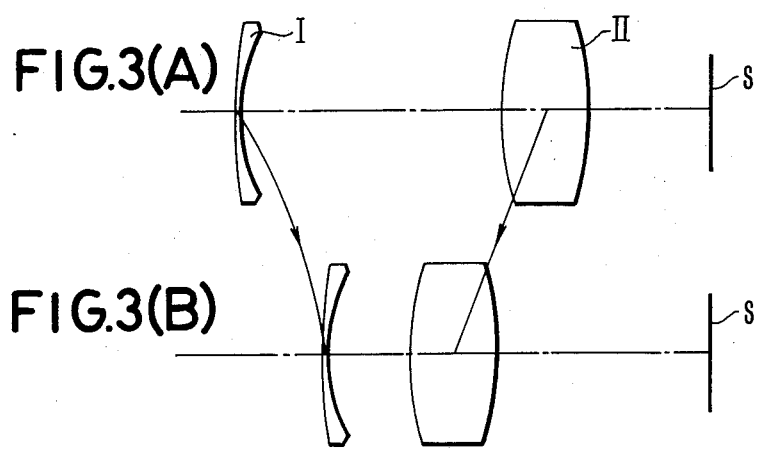
FIG.3(A)
FIG.3(B)
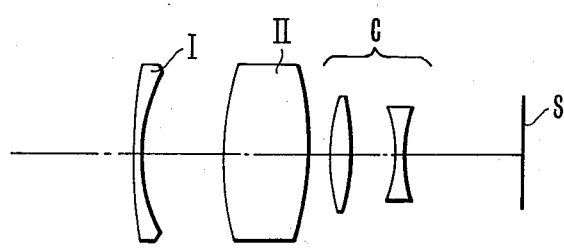
FIG.4

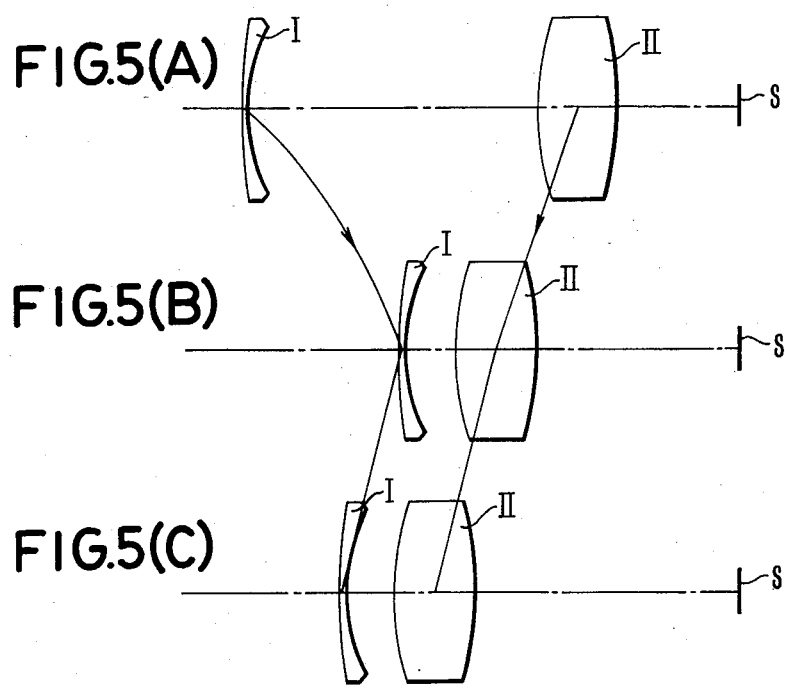
FIG.5(A)
FIG.5(B)
FIG.5(C)
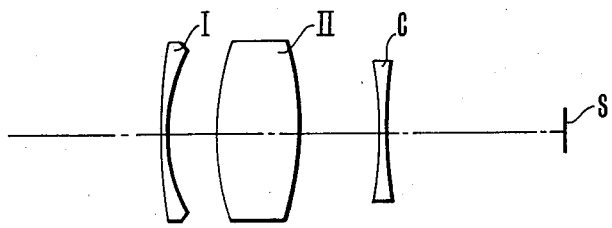
FIG.6

LENS SYSTEM OF VARIABLE MAGNIFICATION RANGE AND HAVING A SUPPLEMENTARY LENS UNIT

BACKGROUND OF THE INVENTION

1. Field of the Invention

This invention relates to zoom lenses suited to photographic cameras or video cameras, and more particularly, to zoom lenses in which a different focal length from those of the usual range of variation of the magnification is obtainable by utilizing a supplementary lens system and a space in which the lens units for zooming axially move, while still preventing the total length of the entire system from increasing.

2. Description of the Related Art

Many methods of changing the focal length of a zoom lens from those of the usual range of variation of the magnification to another one have been proposed.

For example, in Japanese laid-open Patent Application No. Sho 57-42010, a so-called rear conversion method is proposed in which the zoom lens comprising a focusing lens, variator, compensator and relay lens is all moved axially forward, and a supplementary lens system of negative refractive power is inserted into the image side of its last lens surface from the rear of the lens barrel to extend the focal length of the entire system.

This method enables the telephoto ratio to become relatively small, but, there were problems that, for the purpose of attaching the supplementary lens system, it was necessary first to detach the lens barrel and then to insert the supplementary lens system, and that the 4-unit type zoom lens of long total length tended to further increase in the total length.

Also, in Japanese laid-open patent application No. Sho 55-32046, a so-called afocal conversion method is proposed that is to attach a supplementary lens system of infinite focal length in front of the zoom lens to extend or contract the focal lengths of the entire system.

This method enables the shortest or longest focal length of the zoom lens to be respectively decreased or increased relatively easily, but, because the supplementary lens system is attached in front of the zoom lens, the entirety of the lens system tended to increase in size.

These rear conversion method and afocal conversion method, because of involving a large elongation of the total length of the lens or a great increase of the size of the lens system, are not very favorable particularly to the video camera which required that the size of the camera whole be minimized.

Besides these, there is another method of varying the range of variation of the magnification by moving the lens unit which is stationary during zooming. However, this method had a tendency that the number of movable lens units increased and the mechanism of the zoom lens system became more complicated.

Also, there is another method wherein a space into which the supplementary lens system is to be inserted is provided in a portion of the lens system (relay lens) which is stationary during zooming. But, this method must preserve the lens space for insertion of the supplementary lens unit previously in the lens system. Therefore, similarly to the rear conversion method, the total length of the entire system tended to increase.

Also, what is capable of separating the photographic lens out of the camera body at the camera mount portion is relatively easy to insert another optical system in between the zoom lens and the camera body and even the performance is good, but the total length of the lens tended to become larger than when in the usual photographing state.

SUMMARY OF THE INVENTION

A first object of the invention is to provide a zoom lens which is prevented from increasing in the size of the zoom lens system whole.

Also, a second object is to provide a zoom lens capable of changing from the ordinarily usable focal lengths to another focal lengths with ease.

Also, a third object is to provide a zoom lens of small size in which a change to another focal length is made while the total length of the lens is prevented from increasing by achieving an effective utilization of the space in which the lens units for zooming move axially.

Further, a fourth object of the invention is to provide a zoom lens suited to a video camera.

Under this object, in the zoom lens having, from front to rear, a first lens unit of negative refractive power and a second lens unit of positive refractive power, when at least the second lens unit is moved forward to change the magnification from the wide angle side to the telephoto side, the focal length of the entire system is made to change by inserting a supplementary lens system onto the axial image side of the second lens unit in the middle of variation of the magnification or in a zooming position of the telephoto end, or by moving at least the second lens unit forward before the supplementary lens system is inserted.

Further objects of the invention will become apparent from the following description of embodiments thereof by reference to the drawings.

BRIEF DESCRIPTION OF THE DRAWINGS

FIGS. 1(A), 1(B) and 1(C) are schematic diagrams of an optical system in zooming positions of the wide angle end, middle and telephoto end respectively before a supplementary lens system of an embodiment of the invention is inserted.

FIGS. 2(A) and 2(B) are schematic diagrams of the optical system after the supplementary lens system C is inserted in the zooming positions of FIGS. 1(B) and 1(C) respectively to change the range of variation of the magnification.

FIGS. 3(A) and 3(B) are schematic diagrams of an optical system in zooming positions of the wide angle end and telephoto end respectively, before a supplementary lens system of another embodiment of the invention is inserted.

FIG. 4 is a schematic diagram of the optical system after the supplementary lens system C is inserted in the zooming position of FIG. 3(B) to change the focal length.

FIGS. 5(A) and 5(B) are schematic diagrams of an optical system in zooming positions of the wide angle end and telephoto end respectively before a supplementary lens system of still another embodiment of the invention is inserted.

FIG. 5(C) is a schematic diagram of the optical system with the first and second lens units moved forward from the positions of FIG. 5(B).

FIG. 6 is a schematic diagram of the optical system after the supplementary lens system C is inserted in the optical arrangement of FIG. 5(C) to change the focal length.

DETAILED DESCRIPTION OF THE PREFERRED EMBODIMENTS

FIGS. 1(A)–1(C) and FIGS. 2(A), 2(B) are schematic diagrams of the optical system illustrating an embodiment of the invention in which the supplementary lens system is inserted in the middle of the course of varying the magnification.

FIGS. 3(A), 3(B), and FIG. 4 are schematic diagrams of the optical system illustrating another embodiment of the invention in which the supplementary lens system is inserted in the zooming position of the telephoto end.

FIGS. 5(A)–5(C) and FIG. 6 are schematic diagrams of the optical system illustrating still another embodiment of the invention in which a lens system which becomes a master lens in the zooming position of the telephoto end is first moved toward the object side and the supplementary lens system is then inserted.

I denotes the first lens unit of negative refractive power, II denotes the second lens unit of positive refractive power, the arrows indicate the loci of movement of the lens units when zooming, and S is a prescribed image plane. In this position, an image pickup device, for example, CCD is arranged. Here, the first and second lens units are shown each as a singlet for the purpose of convenience, but, each of them is constructed with a plurality of lens elements as a matter of course.

In the embodiments of the invention, when zooming from the wide angle end to the telephoto end, the first lens unit is moved rearward non-linearly, and the second lens unit is moved forward. The first lens unit in some case may otherwise take a convex locus of movement toward the rear depending on the setting of the magnifying power of the second lens unit. On the other hand, the second lens unit moves axially forward when zooming from the wide angle end to the telephoto end.

Here, as shown in FIGS. 1(B), 3(B) and 5(B), the back focus in zooming positions from the middle to the telephoto end is the sum of the back focus at the wide angle end and the moved amount (absolute value) of the second lens unit.

Therefore, in the zooming positions from almost the middle to the telephoto end, a larger space than in the zooming position of the wide angle end is formed on the image side of the second lens unit. In the embodiments of the invention, by inserting a supplementary lens system into the thus-formed lens space between the second lens unit and the image plane, a change from the focal lengths of the usual range of variation of the magnification to another focal lengths.

That is, in the so-called 2-unit zoom lens widely used as the wide angle zoom lens comprising the first lens unit of negative refractive power and the second lens unit of positive refractive power, the second lens unit lies on the object side when on the telephoto side than when on the wide angle side. Therefore, the back focus can be taken relatively long when on the telephoto side.

In the embodiments of the invention, such a feature of the zoom lens system is utilized, and the above-described lens arrangement is employed, thereby an effective utilization of the lens space is accomplished to prevent the total length of the lens from increasing when the focal length is changed.

Also, in the embodiments of the invention, the axial position of the first lens unit is made so as to lie to the image side when on the telephoto side than when on the wide angle side by satisfying the following inequality of condition:

$$-\beta_{2T} < \sqrt{Z} \tag{1}$$

where $\beta_{2T}$ is the magnification of the second lens unit at the telephoto end, and Z is the zoom ratio.

In other words, each lens unit is constructed so as to satisfy the inequality of condition (1), the optical total length (from the first lens surface to the image plane) of the zoom lens is made so as to become maximum in the zooming position of the wide angle end of FIG. 1(A), and the lens barrel is constructed so long as to be able to hold the first lens unit even at that zooming position. Thereby, it is made possible that even when the first lens unit I and the second lens unit II are both moved forward particularly from the zooming position of FIG. 1(B) within the limits of the air separation between the first and second lens units at the wide angle end, being in the state of FIG. 1(C), the total length of the lens is not particularly increased, and that such forward movement can be easily carried out even by the operating mechanism therefor.

Now, FIG. 2(A) illustrates an embodiment of an optical system in which a supplementary lens system C is put on the image side of the second lens unit II in an arbitrary zooming position of the middle shown in FIG. 1(B) to change the range of variation of the magnification. FIG. 2(B) illustrates another embodiment in which a different range of variation of the magnification from that of FIGS. 1(B), 1(C) is obtained by moving the first and second lens units I and II from the zooming position of FIG. 2(A) to directions indicated by arrows in similar loci to those shown in FIGS. 1(B) and 1(C).

Particularly in this embodiment, the supplementary lens system C is constructed with a negative refractive power in the form of a telephoto type lens system so that the range of variation of the magnification is extended toward longer focal lengths.

In this embodiment, the lens design is so set that the focal length in the zooming position of FIG. 2(A) almost coincides with that of the zooming position of the telephoto end shown in FIG. 1(C), and a continuous variation of the magnification is carried out. Yet, the focal length at this time is not always necessarily made coincident, and the variation of the magnification may be made to start from a longer or shorter focal length than that of the zooming position of the telephoto end shown in FIG. 1(C).

A numerical example of the invention is next shown in Table-1 and Table-2. In this example, the supplementary lens system C is constructed with two lens systems, or a lens system C1 of positive refractive power and a lens system C2 of negative refractive power. In the numerical example, $f_1$, $f_2$, $f_{C1}$ and $f_{C2}$ are the focal lengths of the first lens unit I, the second lens unit II, and the lens systems C1 and C2 respectively; $e_1$ is the interval between the principal points of the first and second lens units I and II; $e_2$ is the interval between the principal points of the second lens unit II and the lens system C1; $e_3$ is the interval between the principal points of the lens systems C1 and C2; bf is the back focal distance; and F is the focal length of the entire system.

The columns (A), (B) and (C) shown in Table-1 correspond to the zooming positions of FIGS. 1(A), 1(B) and 1(C) respectively. The columns (A) and (B) shown in Table-2 correspond to the zooming positions of FIGS. 2(A) and 2(B) respectively.

TABLE 1

| | Before Change of Range | | |
|---|---|---|---|
| | Wide Angle (A) | Middle (B) | Telephoto (C) |
| $e_1$ | 56 | 26 | 16 |
| F | 8 | 16 | 24 |
| bf | 26.67 | 33.33 | 40 |

$f_1 = -24$
$f_2 = 20$

TABLE 2

| | After Change of Range | |
|---|---|---|
| | Wide Angle (A) | Middle (B) |
| $e_1$ | 26 | 16 |
| $e_2$ | 15 | 21.67 |
| $e_3$ | 8.75 | 8.75 |
| F | 24.05 | 36.08 |
| bf | 9.58 | 9.58 |

$f_1 = -24$
$f_2 = 20$
$fc_2 = 50$
$fc_2 = -9.088$

In this embodiment, each lens system is so designed that when the supplementary lens system C is attached in the zooming position of FIG. 1(B), the focal length (F=24.05) of the entire system almost coincides with the focal length (F=24) at the telephoto end of FIG. 1(C).

As shown in the Table-1 and Table-2, $e_2+e_3+bf$ of the column (A) of Table-2 coincides with bf of the column (B) of Table-1, and $e_2+e_3+bf$ of the column (B) of Table-2 coincides with bf of the column (C) of Table-1. This implies that the change of the range of variation of the magnification is performed well without any shift of the focal position.

Next, a diagram wherein the supplementary lens system C is put in the zooming position of the telephoto end to change the focal length is shown in FIG. 4.

Also, a numerical example of this case is shown in Table-3 and Table-4.

The columns (A) and (B) shown in Table-3 correspond to the zooming positions of FIGS. 3(A) and 3(B) respectively, and Table-4 corresponds to the optical arrangement of FIG. 4.

TABLE 3

| | Wide Angle End (A) | Telephoto End (B) |
|---|---|---|
| $e_1$ | 56 | 16 |
| F | 8 | 24 |
| bf | 26.67 | 40 |

$f_1 = -24$
$f_2 = 20$

TABLE 4

| $e_1$ | 16 |
|---|---|
| $e_2$ | 15 |
| $e_3$ | 10 |
| F | 36 |
| bf | 15 |

$f_1 = -24$
$f_2 = 20$
$fc_1 = 50$
$fc_2 = -12.0$

In this embodiment, each lens system is so designed that when the supplementary lens system C is put in the zooming position shown in FIG. 3(B), the focal length (F=36) of the entire system becomes longer than the focal length (F=24) at the telephoto end of FIG. 3(B).

As shown in Table-3 and Table-4, $e_2+e_3+bf$ of Table-4 coincides with bf of the column (B) of Table-3, implying that the change of the focal length is performed well without any shift of the focal position.

FIG. 6 is a schematic diagram of an optical system obtained when the first lens unit I and the second lens unit II in the optical arrangement shown in FIG. 5(C) are axially moved forward and a supplementary lens system C is inserted into the image side of the second lens unit II from a direction perpendicular to the optical axis.

Even in this embodiment, the supplementary lens system C is constructed with a lens system of negative refractive power so that the focal length is made to change in a direction to increase.

Next, a numerical example of the invention is shown in Table-5 and Table-6. In the numerical example, $f_1$, $f_2$ and fc are the focal lengths of the first and second lens units I and II and the supplementary lens system C respectively; $e_1$ is the interval between the principal points of the first and second lens units I and II; $e_2$ is the interval between the principal points of the second lens unit II and the supplementary lens system C; bf is the back focal distance; F is the focal length of the entire system.

The columns (A) and (B) of Table-5 correspond to the zooming positions of FIGS. 5(A) and 5(B) respectively, and Table-6 corresponds to the optical arrangement of FIG. 6.

In this embodiment, in the position of FIG. 5(B), the first and second lens units I and II are both moved 10 (mm) forward. Note that at this time, the distance from the first lens surface to an object to be photographed is −62.4 (mm), and the magnification $\beta = -0.417$, or a so-called tele-macro condition is presented.

TABLE 5

| | Wide Angle End (A) | Telephoto End (B) |
|---|---|---|
| $e_1$ | 56 | 16 |
| F | 8 | 24 |
| bf | 26.67 | 40 |

$f_1 = -24$
$f_2 = 20$

TABLE 6

| $e_1$ | 16.0 |
|---|---|
| $e_2$ | 20.0 |
| F | 36.0 |
| bf | 30.0 |

$f_1 = -24$
$f_2 = 20$
$fc = -60.0$

In this embodiment, each lens system is so designed that when the supplementary lens system C is put in the zooming position shown in FIG. 5(B), the focal length (F=36.0) of the entire system becomes longer than the focal length (F=24) at the telephoto end of FIG. 5(B).

As shown in Table-5 and Table-6, $e_2+bf=50$ of Table-6 coincides with the value obtained by adding the forward movement of 10 (mm) to bf=40 of Table-5, implying that the change of the focal length is performed well without any shift of the focal position.

In the present invention, the second lens unit may otherwise be constructed with two or more lens units which, when zooming, are moved forward at different speeds from one another to produce a space in the zooming position of the telephoto end into which the supplementary lens system is inserted.

In addition, the present invention may be applied to a zoom lens system in which a lens unit which is stationary during zooming is arranged on the image side of the second lens unit.

In the present invention, when moving the first and second lens units forward in the zooming position of the telephoto end, both units may be moved forward as a unit, or may be moved forward at different speeds from each other independently of each other, to obtain prescribed focal lengths.

As has been described above, according to the present invention, when varying the magnification, two lens units having prescribed refractive powers are made to move as has been described above, and a supplementary lens system is attached in the thus-produced part of the space for movement, thereby a change from the focal lengths of the usual range of variation of the magnification to other focal lengths can be easily and quickly effected, while avoiding an increase of the total length of the lens. Moreover, since a relatively large space for movement can be secured, a room for design of the supplementary lens system is created to permit achievement of a zoom lens of high performance with good correction of aberrations.

Particularly the present invention is suited to video cameras having no mount for interchangeable lenses, which should be provided, for example, in the single lens reflex camera.

What is claimed is:
1. A zoom lens comprising, from front to rear,
    (a) a first lens unit having a negative refractive power;
    (b) a second lens unit having a positive refractive power, the zooming from the wide angle side to the telephoto side being achieved by moving at least said second lens unit forward; and
    (c) a supplementary lens unit to be inserted in the image side space produced by the movement of said second lens unit.
2. A zoom lens according to claim 1, wherein the position of a prescribed image plane is the same between the state in which said supplementary lens unit is attached and the state in which it is not attached.
3. A zoom lens according to claim 2, wherein said supplementary lens unit includes at least lenses having negative and positive refractive powers.
4. A zoom lens according to claim 2, wherein said supplementary lens unit is attached in a lens position of the telephoto end of zooming achieved by said first and said second lens units.
5. A zoom lens according to claim 2, wherein said supplementary lens unit is attached on the way in the middle between the wide angle end and the telephoto end of zooming achieved by said first and said second lens units.
6. A zoom lens according to claim 5, wherein the shortest focal length at the time when said supplementary lens unit is attached is almost equal to the focal length of the telephoto end of said first and said second lens units.
7. A zoom lens according to claim 1, wherein said supplementary lens unit is attached after said first and said second lens units have been moved forward.
8. A lens system variable in magnification range, comprising:
    a magnification variation portion having a lens unit movable at least toward an object side for performing a first magnification variation relative to a predetermined magnification zone; and
    a supplementary lens unit to be inserted in the space produced by the movement of said lens unit to perform a second magnification variation.
9. A lens system according to claim 8, wherein said supplementary lens unit is inserted at a telephoto end position of the first magnification variation to perform a magnification variation beyond the zone of the first magnification variation.
10. A lens system according to claim 8, wherein said supplementary lens unit is inserted at a position in an intermediate zone of the first magnification variation to obtain a focal length substantially equal to a focal length at the telephoto end relative to the first magnification variation.
11. A lens system according to claim 8, wherein said supplementary lens unit has a negative refractive power.
12. A lens system according to claim 11, wherein said magnification variation portion is composed of said lens unit and a lens unit having a negative refractive power arranged on the object side of said lens unit.

* * * * *